(12) United States Patent
Klug et al.

(10) Patent No.: US 12,504,981 B2
(45) Date of Patent: Dec. 23, 2025

(54) AUTOMATED GRAPHICAL USER INTERFACE CUSTOMIZATION BASED ON BRAND COLORS

(71) Applicant: SAP SE, Walldorf (DE)

(72) Inventors: David Klug, Ladenburg (DE); Dominik Schreiber, Brechen (DE)

(73) Assignee: SAP SE, Walldorf (DE)

( * ) Notice: Subject to any disclaimer, the term of this patent is extended or adjusted under 35 U.S.C. 154(b) by 79 days.

(21) Appl. No.: 18/402,256

(22) Filed: Jan. 2, 2024

(65) Prior Publication Data

US 2025/0217169 A1    Jul. 3, 2025

(51) Int. Cl.
| | | |
|---|---|---|
| G06F 9/451 | (2018.01) | |
| G06T 7/90 | (2017.01) | |
| G06T 11/00 | (2006.01) | |

(52) U.S. Cl.
CPC .............. *G06F 9/451* (2018.02); *G06T 7/90* (2017.01); *G06T 11/001* (2013.01)

(58) Field of Classification Search
CPC ... G06F 9/451; G06F 8/38; G06T 7/90; G06T 11/001
See application file for complete search history.

(56) References Cited

U.S. PATENT DOCUMENTS

| | | | | |
|---|---|---|---|---|
| 8,416,255 | B1 * | 4/2013 | Gilra | G01J 3/526 |
| | | | | 715/810 |
| 8,930,810 | B2 | 1/2015 | Artigue et al. | |
| 11,507,996 | B1 | 11/2022 | Zhou et al. | |
| 2006/0066629 | A1 | 3/2006 | Norlander et al. | |
| 2009/0055813 | A1 * | 2/2009 | Haber | G06F 9/4484 |
| | | | | 717/158 |
| 2009/0217309 | A1 | 8/2009 | Grechanik et al. | |
| 2011/0085697 | A1 * | 4/2011 | Clippard | G06V 10/758 |
| | | | | 382/100 |
| 2012/0201450 | A1 * | 8/2012 | Bryant | H04N 1/62 |
| | | | | 382/162 |
| 2016/0232686 | A1 * | 8/2016 | Park | G06F 3/0481 |
| 2017/0032050 | A1 | 2/2017 | Kol et al. | |
| 2022/0229544 | A1 * | 7/2022 | Kim | G09G 5/02 |
| 2024/0086159 | A1 * | 3/2024 | Kol | G06F 8/36 |
| 2025/0086865 | A1 * | 3/2025 | Menges | G06T 11/00 |

OTHER PUBLICATIONS

Extended European Search Report for European Application No. 24213678.6, mailed on Apr. 16, 2025, 10 pages.

* cited by examiner

*Primary Examiner* — Daniel W Parcher
(74) *Attorney, Agent, or Firm* — Sterne, Kessler, Goldstein & Fox P.L.L.C.

(57) ABSTRACT

Disclosed herein are a system, method, and computer program product embodiments for customizing a GUI based on one or more brand colors of an organization. For example, brand color(s) of an organization may be obtained by a design system and analyzed with respect to default colors assigned to various parameters of a design system. The parameters may correspond to various UI elements (e.g., buttons, text, backgrounds, borders, etc.) of a GUI of an application. In one example, the design system may determine a measure of similarity between each of the obtained brand color(s) and the default colors assigned to the various parameters. For certain parameters, the design system may assign the brand color(s) having the largest measure of similarity with respect to the default colors to the parameters. The GUI of the application may be rendered in accordance with the newly-assigned brand color(s).

20 Claims, 10 Drawing Sheets

| Brand Colors | Hue | Saturation | Lightness |
|---|---|---|---|
| Light Pink (Hex Value: #facade) | 335 | 83% | 89% |
| Bright Turquoise (Hex Value: #0ff1ce) | 171 | 89% | 50% |
| Default Colors for Most Impactful Parameters | | | |
| @myBrandColor = Light Green (Hex Value: #c0ffee) | 164 | 100% | 88% |
| @myTextColor = Black | 0 | 0% | 0% |
| @myContrastTextColor = White | 0 | 0% | 100% |

FIG. 3

|  | @myBrandColor = Light Green (Hex Value: #c0ffee) | @myTextColor = Black | @myContrastTextColor = White |
|---|---|---|---|
| Light Pink (Hex Value: #facade) | $(335 - 164)^2 * (0.83 - 1)^2 * (0.89 - 0.88)^2 = 0.08450649$ | $(335 - 0)^2 * (0.83 - 0)^2 * (0.89 - 0.0)^2 = 61,238.67876$ | $(335 - 0)^2 * (0.83 - 0)^2 * (0.89 - 1)^2 = 935.4728102$ |
| Bright Turquoise (Hex Value: #0ff1ce) | $(171 - 164)^2 * (0.89 - 1)^2 * (0.50 - 0.88)^2 = 0.08561476$ | $(171 - 0)^2 * (0.89 - 0)^2 * (0.50 - 0.0)^2 = 5,790.449025$ | $(171 - 0)^2 * (0.89 - 0)^2 * (0.50 - 1)^2 = 5,790.449025$ |

FIG. 4

| | Hue | Saturation | Lightness |
|---|---|---|---|
| Brand Colors | | | |
| Light Pink (Hex Value: #facade) | 0.930555556 | 0.83 | 0.89 |
| Bright Turquoise (Hex Value: #0ff1ce) | 0.475 | 0.89 | 0.5 |
| Default Colors for Most Impactful Parameters | | | |
| @myBrandColor = Light Green (Hex Value: #c0ffee) | 0.45555556 | 1 | 0.88 |
| @myTextColor = Black | 0 | 0 | 0 |
| @myContrastTextColor = White | 0 | 0 | 1 |

FIG. 5

| | @myBrandColor = Light Green (Hex Value: #c0ffee) | @myTextColor = Black | @myContrastTextColor = White |
|---|---|---|---|
| Light Pink (Hex Value: #facade) | $10\% * (0.93055556 - 0.455555564)^2 + 30\% * (0.83 - 1)^2 + 60\% * (0.89 - 0.88)^2 = 0.0312925$ | $10\% * (0.93055556 - 0)^2 + 30\% * (0.83 - 0)^2 + 60\% * (0.89 - 0.0)^2 = 0.768523365$ | $10\% * (0.93055556 - 0)^2 + 30\% * (0.83 - 0)^2 * 60\% + (0.89 - 1)^2 = 0.300523365$ |
| Bright Turquoise (Hex Value: #0ff1ce) | $10\% * (0.475 - 0.455555564)^2 + 30\% * (0.89 - 1)^2 + 60\% * (0.50 - 0.88)^2 = 0.090307780847$ | $10\% * (0.475 - 0)^2 + 30\% * (0.89 - 0)^2 + 60\% * (0.50 - 0.0)^2 = 0.4101925$ | $10\% * (0.475 - 0)^2 + 30\% * (0.89 - 0)^2 + 60\% * (0.50 - 1.0)^2 = 0.4101925$ |

FIG. 6

AUTOMATED GRAPHICAL USER INTERFACE CUSTOMIZATION BASED ON BRAND COLORS

BACKGROUND

Background

Custom themes play an important role for organization. For example, such themes add a touch of uniqueness and personalization to the user experience. A user interface theme designer may offer a convenient starting point for drafting bespoke themes tailored to individual preferences. With the use of a user interface theme designer, customers can effortlessly infuse their applications with their corporate branding. However, it is not always easy to generate a theme. A user needs to know the corporate branding guidelines of their company and then map them according to theme parameters. The problem is that the user interface theme designer may have hundreds of different customizable parameters. Users must pay close attention when generating a theme to ensure that the custom theme provides a desirable appearance that conforms with the brand of the organization.

BRIEF DESCRIPTION OF THE DRAWINGS

The accompanying drawings are incorporated herein and form a part of the specification.

FIG. 3 is a table comprising a list of obtained brand colors and a list of default colors assigned to parameters determined to be the most impactful, according to some embodiments.

FIG. 4 is a table comprising measures of similarity determined based on a product of squared differences, according to some embodiments.

FIG. 5 is a table comprising a list of normalized brand color values and a list of normalized default color values assigned to parameters determined to be the most impactful, according to some embodiments.

FIG. 6 is a table comprising measures of similarity determined based on a sum of weighted squared differences, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are a system, apparatus, device, method and/or computer program product embodiments, and/or combinations and sub-combinations thereof, for customizing a GUI based on one or more brand colors of an organization. For example, brand color(s) of an organization may be obtained by a design system and analyzed with respect to default colors assigned to various parameters of a design system. The parameters may correspond to various UI elements (e.g., buttons, text, backgrounds, borders, etc.) of a GUI of an application. In one example, the design system may determine a measure of similarity between each of the obtained brand color(s) and the default colors assigned to the various parameters. For certain parameters, the design system may assign the brand color(s) having the largest measure of similarity with respect to the default colors to the parameters. The GUI of the application may be rendered in accordance with the newly-assigned brand color(s).

The embodiments described herein automatically selects a harmonious set of colors and weaves them into an entirely new custom theme without having the user to manually select a color for hundreds of different parameters. For example, the design system may provide an interface via which a user may specify the brand colors. In another example, the design system may provide an interface via which a user may upload an image (e.g., a logo) representative of an organization. Responsive to uploading the image, the design system may analyze the image to automatically determine brand color(s) representative of the organization. In either example, once the brand color(s) are determined, the design system automatically determines which parameters are to be assigned which brand color(s) based on various techniques described herein.

With such simple and user-friendly interactions at their disposal, users are provided a custom theming process that is not only accessible, but also remarkably efficient. Moreover, the embodiments described herein provide improvements to a GUI. For instance, the simplicity of simply inputting the brand colors and automatically assigning the brand colors to the appropriate design system parameters greatly simplifies the GUI of the design system, as the number of user interface elements required to generate the custom theme is greatly reduced. As an example, conventional design systems may provide a user interface element for each parameter that enables the user to manually set the color for the corresponding GUI of the application. Accordingly, a design system in which there are hundreds of parameters would include hundreds of such user interface elements. The enormity of the user interface elements causes the GUI of the design system to be cluttered and makes navigability cumbersome. The embodiments described herein remedy such issues, as the hundreds of user interface elements required to specify colors for hundreds of parameters is no longer needed.

Figure 1:
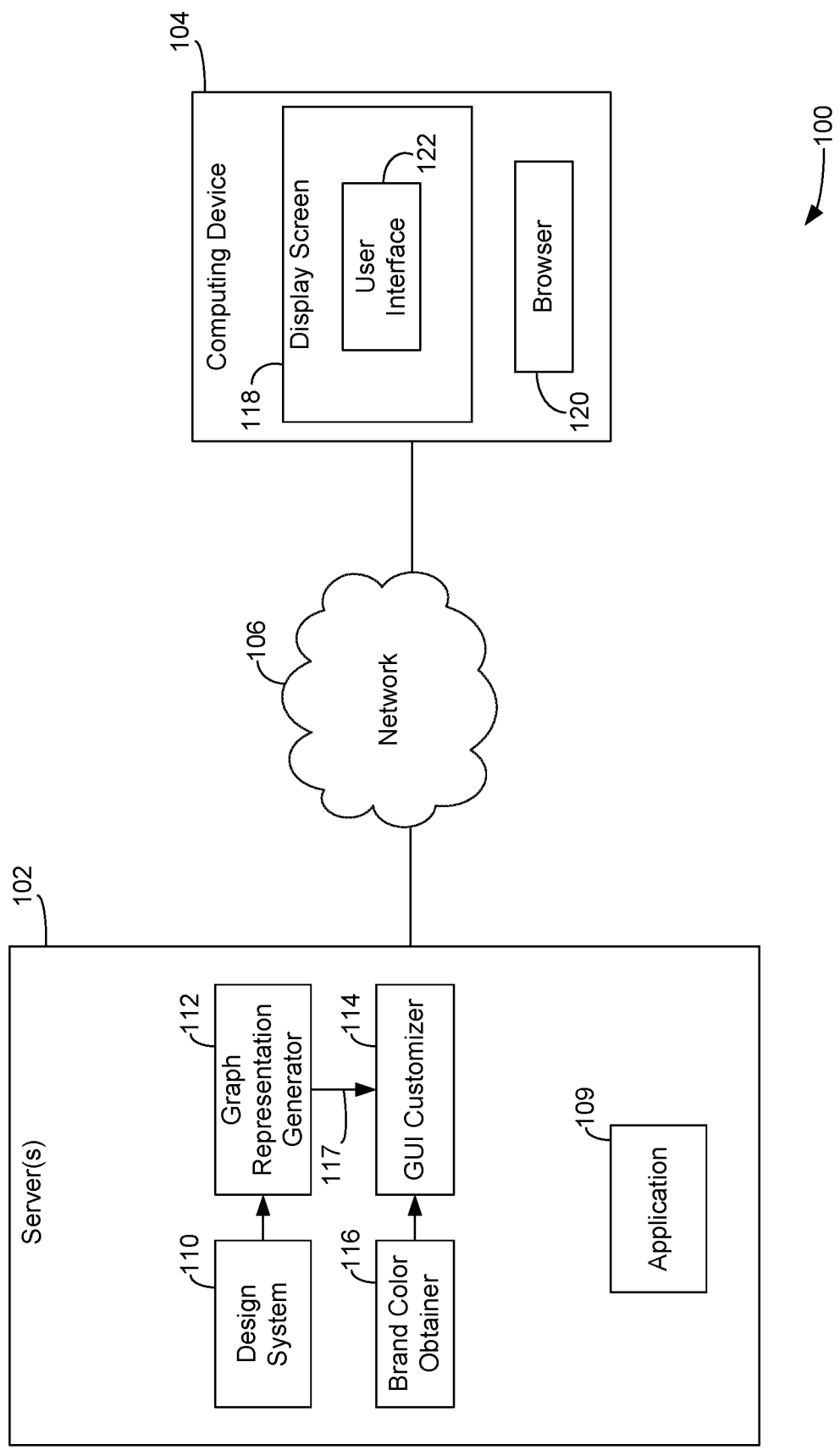
FIG. 1 is a block diagram of a system configured to customize a user interface of an application, according to some embodiments.

FIG. 1 shows a block diagram of a system 100 configured to customize a user interface of an application, according to some embodiments. As shown in FIG. 1, system 100 includes one or more servers 102 and a computing device 104. Server(s) 102 and computing device 104 may be communicatively coupled to each other via a network 106. Network 106 may comprise one or more networks such as local area networks (LANs), wide area networks (WANs), enterprise networks, the Internet, etc., and may include one or more of wired and/or wireless portions.

In an embodiment, server(s) 102 may form a network-accessible server set (e.g., a cloud-based environment or platform). Server(s) 102 may be accessible via network 106 (e.g., in a "cloud-based" embodiment) to build, deploy, and manage applications and services. Server(s) 102 may be co-located (e.g., housed in one or more nearby buildings with associated components such as backup power supplies, redundant data communications, environmental controls, etc.) to form a datacenter, or may be arranged in other manners. Accordingly, in an embodiment, server(s) 102 may be a datacenter in a distributed collection of datacenters.

Server(s) 102 may be configured to execute one or more software applications (or "applications") (e.g., application 109) and/or services. Server(s) 102 may also be configured for specific uses. For example, as shown in FIG. 1, server(s) 102 may comprise a design system 110 for application 109, a graph representation generator 112, a brand color obtainer 116, and a graphical user interface (GUI) customizer 114. Design system 110 may comprise a set of components, rules, style guides, and/or documentation utilized to build, generate, and/or modify the appearance of a user interface of application 109. For example, design system 110 may provide a plurality of parameters that define various colors, styles, and/or assets that describe the appearance of application 109. It is noted that while FIG. 1 depicts application 109, design system 110, graph representation generator 112, brand color obtainer 116, and GUI customizer 114 as distinct components, design system 110, graph representation generator 112, brand color obtainer 116, and/or GUI customizer 114 may be integrated into application 109. It is further noted that design system 110, graph representation generator 112, brand color obtainer 116, and GUI customizer 114, and/or application 109 may execute on computing device 104 in lieu of and/or in addition to executing on server(s) 102.

A user may access and/or utilize design system 110, graph representation generator 112, brand color obtainer 116, and/or GUI customizer 114 via computing device 106. As shown in FIG. 1, computing device 106 includes a display screen 118 and a browser 120. A user may access and/or utilize design system 110, graph representation generator 112, brand color obtainer 116, and/or GUI customizer 114 by interacting with an application at computing device 104 capable of accessing design system 110. For example, the user may use browser 120 to traverse a network address (e.g., a uniform resource locator) to design system 110, graph representation generator 112, brand color obtainer 116, and/or GUI customizer 114, which invokes a user interface 122 (e.g., a web page) in a browser window rendered on computing device 104. By interacting with the user interface, the user may invoke design system 110, graph representation generator 112, brand color obtainer 116, and/or GUI customizer 114. Computing device 104 may be any type of stationary device, such as a desktop computer or PC (personal computer), or mobile computing device (such as a laptop computer, a notebook computer, a tablet computer, etc.).

Design system 110 may comprise a plurality of parameters, where some or all of such parameters are mapped to other parameters (e.g., certain parameters may reference other parameters). In one example, one or more of the parameters may be color parameters for defining colors for particular user interface elements (e.g., buttons, text, borders, backgrounds, etc.). The following code snippet is one example of design system 110 (also referred to as a parameter mapping):

```
@myBrandColor: light green;
@myTextColor: black;
@myContrastTextColor: white;
@myComponent_Background: @myBrandColor;
@myButton_Emphasized_Background: @myComponent_Background;
@myButton_Emphasized_BorderColor: darken(@myBrandColor, 10%);
@myButton_Emphasized_TextColor: contrast (
    @myButton_Emphasized_Background,
    @myTextColor,
    @myContrastTextColor
);
```

In the code snippet shown above, the background of an emphasized button (i.e., @myButton_Emphasized_Background) and the border color of the emphasized button (i.e., @myButton_Emphasized_BorderColor) are mapped to the more general brand color (i.e., @myBrandColor). As also shown above, certain parameters may include a particular color function (e.g., darken( )) to modify the appearance of the color mapped thereto. As further shown above, certain parameters may be mapped to other parameters via multiple levels of nesting (e.g., @myButton_Emphasized_Background is mapped to @myComponent_Background, which in turn is mapped to @myBrandColor). The parameters described may be mapped to default color values by design system 110. As described herein, the color values mapped to such parameters may be automatically customized in accordance with one or more brand colors of an organization. Brand colors may comprise a palette of colors utilized to represent an identity or style of particular organization. Examples of an organization include, but are not limited to, corporations, governments, charities, educational institutions, etc. It is noted that the parameter names and mappings therebetween described in the code snippet above are purely exemplary and that other parameter names and mappings therebetween may be utilized. It is further noted that while the code snippet of design system 110 described above is in accordance with a leaner style sheets (LESS)-based representation, other representations may be utilized.

Graph representation generator 112 may be configured to generate a directed graph representation 117 of design system 110. For example, graph representation generator 112 may analyze design system 110 to determine dependencies between different parameters and generate a data structure representative of a directed graph comprising the parameters of design system 110.

Figure 2:
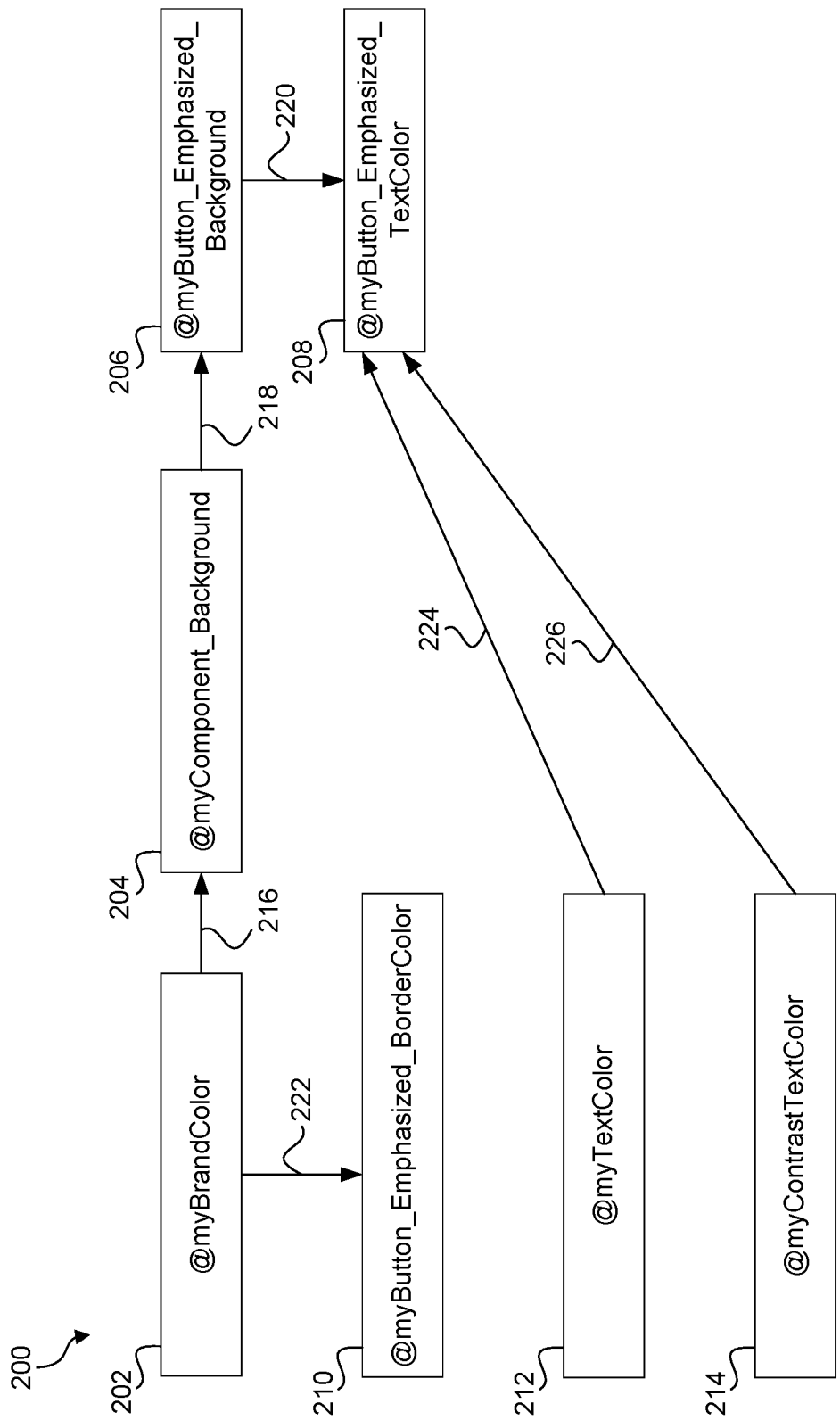
FIG. 2 is a directed graph representation of a design system, according to some embodiments.

For example, FIG. 2 is a directed graph representation 200 of design system 110, according to some embodiments. Directed graph representation 200 is an example of directed graph representation 117, as shown in FIG. 1. As shown in FIG. 2, directed graph representation 200 may comprise a plurality of nodes 202, 204, 206, 208, 210, 212, and 214. Node 202 represents the @myBrandColor parameter, node 204 represents the @myComponent_Background parameter, node 206 represents the @myButton_Emphasized_Background parameter, node 208 represents the @myButton_Emphasized_TextColor parameter, node 210 represents the @myButton_Emphasized_BorderColor parameter, node 212 represents the @myTextColor parameter, and node 214 represents the @myContrastTextColor parameter. Based on the analysis of design system 110, graph representation generator 112 may determine mappings (or dependencies) between different parameters. For instance, in accordance with directed graph representation 200, graph representation generator 112 may determine that the @myBrandColor parameter is mapped to the @myComponent_Background parameter, the @myComponent_Background parameter is mapped to the @myButton_Emphasized_Background parameter, and the @myComponent_Emphasized_Background parameter is mapped to the @myButton_Emphasized_TextColor parameter. To represent such dependencies, graph representation generator 112 may couple node 202 and 204 with an outgoing edge 216 from node 202 to node 204, may couple node 204 and 206 with an outgoing edge 218 from node 204 to node 206, and may couple node 206 and 208 with an outgoing edge 220 from node 206 and node 208. The chaining of such nodes indicates that the color mapped to the @myBrandColor parameter (i.e., light green) is assigned to each the @myBrandColor, @myComponent_Background, @myButton_Emphasized_Background, and @myButton_Emphasized_TextColor parameters. In another example, graph representation generator 112 may also determine that the @myBrandColor parameter is also mapped to the @myButton_Emphasized_BorderColor parameter. Accordingly, graph representation generator 112 may couple node 202 and node 210 with an outgoing edge 222. As further shown in FIG. 2, multiple parameters may be mapped to a particular parameter. For instance, the @myTextColor and @myContrastTextColor parameters may be mapped to the @myButton_Emphasized_TextColor parameter. Accordingly, graph representation generator 112 may couple node 212 and node 208 with an outgoing edge 224 and may couple node 214 and node 208 with an outgoing edge 226.

GUI customizer 114 may be configured to customize a GUI of application 109 based on brand color(s) of an organization. For example, GUI customizer 114 may analyze directed graph representation 117 and determine parameters having the most impact on the GUI (e.g., color parameters that have the most dependencies). Such a metric may indicate how prevalent a particular color appears throughout the GUI. To determine the most impactful parameters, GUI customizer 114 may analyze directed graph representation 117 and determine the root nodes thereof (i.e., nodes that do not have any parent or only have outgoing edges originating therefrom, and do not have any incoming edges). In the example shown in FIG. 2, nodes 202, 212, and 214 may be determined to be root nodes, and nodes 204, 206, 210, and 220 may be considered as child nodes (e.g., a node having an incoming edge). For each determined root node, GUI customizer 114 may recursively traverse directed graph representation 200 to determine a number of direct and indirect outgoing edges originating from the root node. For instance, as shown in FIG. 2, GUI customizer 114 may determine that node 202 may have two direct outgoing edges 216 and 222 (as they directly couple node 202 to nodes 204 and 210, respectively) and two indirect outgoing edges 218 and 220 (where edge 218 indirectly couples node 206 with node 202 and edge 220 indirectly couples node 208 with node 202). GUI customizer 114 may also determine that each of node 212 and node 214 may have one direct outgoing edge (i.e., edge 224 and 226, respectively).

GUI customizer 114 may sort the determined root nodes based on the total number of outgoing edges for each root node. GUI customizer 114 may sort such nodes in either an ascending or descending order. In an example in which the root nodes are sorted in ascending order, node 202 may be listed first (as it has the most outgoing edges (i.e., 4)) and either node 212 and node 214 may be listed second or third, respectively, as they both have one outgoing edge. In an embodiment, GUI customizer 114 may limit the number of total number of determined root nodes based on the number of outgoing edges. For instance, GUI customizer 114 may select root nodes having a number of outgoing edges that meets a predetermined threshold (e.g., a number of edges greater than or equal to 2).

After determining the most impactful parameters, GUI customizer 114 may determine a measure of similarity between brand color(s) of an organization and each of the default colors assigned to the most impactful parameters. The brand color(s) may be obtained by brand color obtainer 116. Brand color obtainer 116 may be configured to determine the brand color(s) of an organization in various ways. For example, a user may specify the brand color(s) of the organization via user interface 122. In another example, a user may upload an image representative of the organization (e.g., a logo) via user interface 122 and brand color obtainer 116 may automatically determine the brand color(s) based on the image. For instance, color obtainer 116 may generate a color histogram based on the image, where the color histogram represents the distribution of the composition of colors in the image. The top N colors of the image that are represented the most via the histogram may be determined to be the brand color(s), where N is any positive integer. In a further example, color obtainer 116 may comprise a large language model (LLM)-based interface that enables a user to instruct the LLM using natural language to determine brand color(s) represented of the image. The LLM may be trained to output a set of brand color(s) based on an image inputted thereto. The LLM may be further trained to map the set of brand color(s) to different parameters of the GUI. In accordance with an embodiment, the image may be an Extensible Markup Language (XML)-based image, such as a Scalable Vector Graphics (SVG)-based image. However, it is noted that other image types may be utilized, including, but not limited to, a Joint Photographic Experts Group (JPEG)-based image, a bitmap image, etc.

Referring again to GUI customizer 114, GUI customizer 114 may be configured to determine a measure of similarity between the obtained brand color(s) and each of the default colors assigned to the most impactful parameters in various ways. For instance, GUI customizer 114 may determine the measure of similarity based on a product of squared differences between the obtained brand color(s) and each of the default colors assigned to the most impactful parameters. For example, FIG. 3 is a table 300 comprising a list of obtained brand colors and a list of default colors assigned to parameters determined to be the most impactful, according to some embodiments. As shown in FIG. 3, table 300 comprises a column 302 comprising a list of brand colors obtained by brand color obtainer 116 and the default colors assigned to the most impactful parameters, as determined by brand color obtainer 116. In the example shown in FIG. 3, the obtained brand colors are light pink (hex value #facade) and bright turquoise (hex value #Office) and the default colors assigned to the most impactful parameters (e.g., the @myBrandColor, @myTextColor, and @myContrastTextColor paramters) are light green (hex value #coffee), black, and white, respectively. As further shown in FIG. 3, each of the colors in column 302 may be associated with a plurality of color values defining the color. In one example, the plurality of color values comprise a hue value, a saturation value, and a lightness value, as respectively shown in columns 304, 306, and 308. The hue value may be between 0 and 360 and represents a degree on a color wheel, where a value of 0 represents the color red, a value of 120 represents the color green, and a value of 240 represents the color blue.

The saturation value may be a percentage value ranging between 0% and 100%, where 0% represents a shade of gray and 100% corresponds to the full color. The lightness value may also be a percentage value ranging between 0% and 100%, where 0% represents black and 100% represents white. It is noted that color schemes than hue, saturation, and lightness may be utilized to represent a particular color, including, but not limited to a red-blue-green (RGB) color scheme.

GUI customizer 114 may be configured to measure of similarity based on a product of squared differences between the plurality of color values. For example, FIG. 4 is a table 400 comprising measures of similarity determined based on a product of squared differences, according to some embodiments. As shown in FIG. 4, GUI customizer 114 may determine a measure of similarity between each obtained brand color and each of the default colors assigned to the most impactful parameters. For instance, to determine a measure of similarity between the obtained brand color of light pink and the default color value of the @myBrandColor parameter (i.e., light green), GUI customizer 114 may square the difference between the hue value of light pink (i.e., 335) and the hue value of light green (i.e., 164) to generate a first squared difference value, may square the difference between the saturation value of light pink (i.e., 0.83) and the saturation value of light green (i.e., 1) to generate a second squared difference value, and may square the difference between the lightness value of light pink (i.e., 0.89) and the lightness value of light green (i.e., 0.88) to generate a third squared difference value. GUI customizer 114 may then determine a product of the first squared difference value, the second squared difference value, and the third squared difference value. The determined product corresponds to the measure of similarity (i.e., 0.08450649) between the colors light pink and light green.

To determine a measure of similarity between the obtained brand color of bright turquoise and the default color value of the @myBrandColor parameter (i.e., light green), GUI customizer 114 may square the difference between the hue value of bright turquoise (i.e., 171) and the hue value of light green (i.e., 164) to generate a first squared difference value, may square the difference between the saturation value of bright turquoise (i.e., 0.89) and the saturation value of light green (i.e., 1) to generate a second squared difference value, and may square the difference between the lightness value of bright turquoise (i.e., 0.50) and the lightness value of light green (i.e., 0.88) to generate a third squared difference value. GUI customizer 114 may then determine a product of the first squared difference value, the second squared difference value, and the third squared difference value. The determined product corresponds to the measure of similarity (i.e., 0.08561476) between the colors bright turquoise and light green.

To determine a measure of similarity between the obtained brand color of light pink and the default color value of the @myTextColor parameter (i.e., black), GUI customizer 114 may square the difference between the hue value of light pink (i.e., 335) and the hue value of black (i.e., 0) to generate a first squared difference value, may square the difference between the saturation value of light pink (i.e., 0.83) and the saturation value of black (i.e., 0) to generate a second squared difference value, and may square the difference between the lightness value of light pink (i.e., 0.89) and the lightness value of black (i.e., 0) to generate a third squared difference value. GUI customizer 114 may then determine a product of the first squared difference value, the second squared difference value, and the third squared difference value. The determined product corresponds to the measure of similarity (i.e., 61,238.67876) between the colors light pink and black.

To determine a measure of similarity between the obtained brand color of bright turquoise and the default color value of the @myTextColor parameter (i.e., black), GUI customizer 114 may square the difference between the hue value of bright turquoise (i.e., 171) and the hue value of black (i.e., 0) to generate a first squared difference value, may square the difference between the saturation value of bright turquoise (i.e., 0.89) and the saturation value of black (i.e., 0) to generate a second squared difference value, and may square the difference between the lightness value of bright turquoise (i.e., 0.50) and the lightness value of black (i.e., 0) to generate a third squared difference value. GUI customizer 114 may then determine a product of the first squared difference value, the second squared difference value, and the third squared difference value. The determined product corresponds to the measure of similarity (i.e., 5,790.449025) between the colors bright turquoise and black.

To determine a measure of similarity between the obtained brand color of light pink and the default color value of the @myContrastTextColor parameter (i.e., white), GUI customizer 114 may square the difference between the hue value of light pink (i.e., 335) and the hue value of white (i.e., 0) to generate a first squared difference value, may square the difference between the saturation value of light pink (i.e., 0.83) and the saturation value of white (i.e., 0) to generate a second squared difference value, and may square the difference between the lightness value of light pink (i.e., 0.89) and the lightness value of white (i.e., 1) to generate a third squared difference value. GUI customizer 114 may then determine a product of the first squared difference value, the second squared difference value, and the third squared difference value. The determined product corresponds to the measure of similarity (i.e., 935.4728102) between the colors light pink and white.

To determine a measure of similarity between the obtained brand color of bright turquoise and the default color value of the @myTextColor parameter (i.e., white), GUI customizer 114 may square the difference between the hue value of bright turquoise (i.e., 171) and the hue value of white (i.e., 0) to generate a first squared difference value, may square the difference between the saturation value of bright turquoise (i.e., 0.89) and the saturation value of white (i.e., 0) to generate a second squared difference value, and may square the difference between the lightness value of bright turquoise (i.e., 0.50) and the lightness value of white (i.e., 1) to generate a third squared difference value. GUI customizer 114 may then determine a product of the first squared difference value, the second squared difference value, and the third squared difference value. The determined product corresponds to the measure of similarity (i.e., 5,790.449025) between the colors bright turquoise and white.

In an embodiment, GUI customizer 114 may discard determined measures of similarity that exceed a predetermined threshold. In one example, the predetermined threshold may be the value of 1. In such an example, the determined measures of similarity between the colors light pink and light green (i.e., 0.08450649) and the colors bright turquoise and light green (i.e., 0.08561476) are kept as they do not exceed the value of 1, and all other determined measures of similarity are discarded. It is noted that the embodiments described herein are not limited to the predetermined threshold described above and that other predetermined thresholds may be utilized. The resulting measures of similarity may be weighted by the impact of the corresponding parameter. For instance, the measure of similarity between the colors light pink and light green (i.e., 0.08450649) may be combined with (e.g., multiplied) a representation of the determined impact of the @myBrandColor parameter to which the color light green is assigned. As described above, the impact of the @myBrandColor parameter was 4, as the @myBrandColor parameter is associated with 4 total outgoing edges (as depicted in FIG. 2). The representation of the determined impact may include, but is not limited to, the determined impact value itself, an inverse of the determined impact value, a fractional value based on the impact value, or any other representation. Similarly, the measure of similarity between the colors bright turquoise and light green (i.e., 0.08561476) may be combined with the determined impact (e.g., 4) of the @myBrandColor parameter to which the color light green is assigned. The resulting weighed measures of similarity may be sorted, for example, in ascending or descending order and may be referred to as potential mappings. The following snippet depicts the potential mappings in accordance with the examples described above:

```
potential_mappings = [
  <#0ff1ce, @myBrandColor>, // 0.0856147 * 4 = 0.34245904
  <#facade, @myBrandColor>, // 0.08450649 * 4 = 0.33802592
]
```

For each parameter, GUI customizer 114 may assign the obtained brand color having the highest weighted measure of similarity (or potential mapping value) to the parameter. In the example described above, the @myBrandColor parameter is assigned the bright turquoise color, as this color has the highest weighted measure of similarity with respect to the @myBrandColor parameter. For instance, GUI customizer 114 may replace the default color of the @myBrandColor parameter (i.e., light green) with the color bright turquoise. The following snippet depicts the new color assignment:

```
@myBrandColor: #0ff1ce;
```

Per the example shown in FIG. 2, such an assignment affects a plurality of other parameters that depend from the @myBrandColor parameter, including, the @myComponent_Background parameter, the @myButton_Emphasized_Background parameter, and the @myButton_Emphasized_TextColor parameter. That is, the color bright turquoise is also applied to these parameters.

All other potential mappings may be discarded for the @myBrandColor parameter, and the process described above may be repeated for any other parameters that are associated with a measure of similarity to a particular color that does not exceed the predetermined threshold. In the example described above, no such parameters exist, and therefore, no other color assignments are performed.

In an example embodiment, GUI customizer 114 may determine the measure of similarity based on a difference of a subset of the plurality of color values rather than the difference of all the plurality of color values. For example, the measure of similarity may be based on the difference of one or more of the hue value, the saturation value, or the lightness value of corresponding colors.

In another example embodiment, the measure of similarity may be based on the sum of normalized and weighted differences, where each color value is normalized between the values 0 and 1, and each of the color values is weighted by a particular weight parameter. For example, FIG. 5 is a table 500 comprising a list of normalized brand color values and a list of normalized default color values assigned to parameters determined to be the most impactful, according to some embodiments. As shown in FIG. 5, table 500 comprises a column 502 comprising a list of brand colors obtained by brand color obtainer 116 and the default colors assigned to the most impactful parameters, as determined by GUI customizer 114. Column 504 comprises normalized hue values corresponding to the hue values depicted in column 302 of FIG. 3, column 506 comprises normalized saturation values corresponding to the saturation values depicted in column 306 of FIG. 3, and column 508 comprises normalized lightness values corresponding to the lightness values depicted in column 308 of FIG. 3

FIG. 6 is a table 600 comprising measures of similarity determined based on a sum of weighted squared differences, according to some embodiments. To determine a measure of similarity between the obtained brand color of light pink and the default color value of the @myBrandColor parameter (i.e., light green), GUI customizer 114 may square the difference between the normalized hue value of light pink (i.e., 0.93055556) and the normalized hue value of light green (i.e., 0.455555564), and apply a first weight parameter (e.g., 10%) to the determined squared difference value to generate a first weighted squared difference value. GUI customizer 114 may also square the difference between the normalized saturation value of light pink (i.e., 0.83) and the normalized saturation value of light green (i.e., 1), and apply a second weight parameter (e.g., 30%) to the determined squared difference value to generate a second weighted squared difference value. The GUI customizer 114 may also square the difference between the normalized lightness value of light pink (i.e., 0.89) and the normalized lightness value of light green (i.e., 0.88), and apply a third weight parameter (e.g., 60%) to the determined squared differenced value to generate a third weighted squared difference value. GUI customizer 114 may then determine a sum of the first weighted squared difference value, the second weighted squared difference value, and the third weighted squared difference value. The determined sum corresponds to the measure of similarity (i.e., 0.0312925) between the colors light pink and light green.

To determine a measure of similarity between the obtained brand color of bright turquoise and the default color value of the @myBrandColor parameter (i.e., light green), GUI customizer 114 may square the difference between the normalized hue value of bright turquoise (i.e., 0.475) and the normalized hue value of light green (i.e., 0.455555564), and apply a first weight parameter (e.g., 10%) to the determined squared difference value to generate a first weighted squared difference value. GUI customizer 114 may also square the difference between the normalized saturation value of bright turquoise (i.e., 0.89) and the normalized saturation value of light green (i.e., 1), and apply a second weight parameter (e.g., 30$) to the determined squared difference value to generate a second weighted squared difference value. GUI customizer 114 may also square the difference between the normalized lightness value of bright turquoise (i.e., 0.50) and the normalized lightness value of light green (i.e., 0.88), and apply a third weight parameter (e.g., 60%) to the determined squared difference to generate a third weighted squared difference value. GUI customizer 114 may then determine a sum of the first weighted squared difference value, the second weighted squared difference value, and the third weighted squared difference value. The determined sum corresponds to the measure of similarity (i.e., 0.09030780847) between the colors bright turquoise and light green.

To determine a measure of similarity between the obtained brand color of light pink and the default color value of the @myTextColor parameter (i.e., black), GUI customizer 114 may square the difference between the normalized hue value of light pink (i.e., 0.93055556) and the normalized hue value of black (i.e., 0), and apply a first weight parameter (e.g., 10%) to the determined squared difference value to generate a first weighted squared difference value. GUI customizer 114 may also square the difference between the normalized saturation value of light pink (i.e., 0.83) and the normalized saturation value of black (i.e., 0), and apply a second weight parameter (e.g., 30%) to the determined squared difference value to generate a second weighted squared difference value. GUI customizer 114 may also square the difference between the normalized lightness value of light pink (i.e., 0.89) and the normalized lightness value of black (i.e., 0), and apply a third weight parameter (e.g., 60%) to the determined squared difference value and generate a third weighted squared difference value. GUI customizer 114 may then determine a sum of the first weighted squared difference value, the second weighted squared difference value, and the weighted third squared difference value. The determined sum corresponds to the measure of similarity (i.e., 0.768523365) between the colors light pink and black.

To determine a measure of similarity between the obtained brand color of bright turquoise and the default color value of the @myTextColor parameter (i.e., black), GUI customizer 114 may square the difference between the normalized hue value of bright turquoise (i.e., 0.475) and the normalized hue value of black (i.e., 0), and apply a first weight parameter (e.g., 10%) to the determined squared difference value to generate a first squared difference value. GUI customizer 114 may also square the difference between the normalized saturation value of bright turquoise (i.e., 0.89) and the normalized saturation value of black (i.e., 0), and apply a second weight parameter (e.g., 30%) to the determined squared difference value to generate a second weighted squared difference value. GUI customizer 114 may also square the difference between the normalized lightness value of bright turquoise (i.e., 0.50) and the normalized lightness value of black (i.e., 0), and apply a third weight parameter (e.g., 60%) to the determined squared difference value to generate a third weighted squared difference value. GUI customizer 114 may then determine a sum of the first weighted squared difference value, the second weighted squared difference value, and the third weighted squared difference value. The determined sum corresponds to the measure of similarity (i.e., 0.4101925) between the colors bright turquoise and black.

To determine a measure of similarity between the obtained brand color of light pink and the default color value of the @myContrastTextColor parameter (i.e., white), GUI customizer 114 may square the difference between the normalized hue value of light pink (i.e., 0.93055556) and the normalized hue value of white (i.e., 0), and apply a first weight parameter (e.g., 10%) to the determined squared difference value to generate a first weighted squared difference value. GUI customizer 114 may also square the difference between the normalized saturation value of light pink (i.e., 0.83) and the normalized saturation value of white (i.e., 0), and apply a second weight parameter (e.g., 30%) to the determined squared difference value to generate a second weighted squared difference value. GUI customizer 114 may also square the difference between the normalized lightness value of light pink (i.e., 0.89) and the normalized lightness value of white (i.e., 1), and apply a third weigh parameter (e.g., 60%) to the determined squared difference value to generate a third weighted squared difference value. GUI customizer 114 may then determine a sum of the first weighted squared difference value, the second weighted squared difference value, and the third weighted squared difference value. The determined sum corresponds to the measure of similarity (i.e., 0.300523365 between the colors light pink and white.

To determine a measure of similarity between the obtained brand color of bright turquoise and the default color value of the @myTextColor parameter (i.e., white), GUI customizer 114 may square the difference between the normalized hue value of bright turquoise (i.e., 0.475) and the normalized hue value of white (i.e., 0), and apply a first weight parameter (e.g., 10%) to the determined squared difference value to generate a first weighted squared difference value. GUI customizer 114 may also square the difference between the normalized saturation value of bright turquoise (i.e., 0.89) and the normalized saturation value of white (i.e., 0), and apply a second weight parameter (e.g., 30%) to the determined squared difference value to generate a second weighted squared difference value. GUI customizer 114 may also square the difference between the normalized lightness value of bright turquoise (i.e., 0.50) and the normalized lightness value of white (i.e., 1), and apply a third weight parameter (e.g., 60%) to the determined square difference value to generate a third weighted squared difference value. GUI customizer 114 may then determine a sum of the first weighted squared difference value, the weighted second squared difference value, and the weighted third squared difference value. The determined sum corresponds to the measure of similarity (i.e., 0.4101925) between the colors bright turquoise and white.

As described above with reference to FIGS. 3 and 4, the determined measures of similarity that exceed a predetermined threshold may be discarded by GUI customizer 114. The predetermined threshold utilized in the example described above with reference to FIGS. 5 and 6 may be different than the predetermined threshold described above with reference to FIGS. 3 and 4. For example, the predetermined threshold may be the value of 0.1. In such an example, the determined measures of similarity between the colors light pink and light green (i.e., 0.0312925) and the colors bright turquoise and light green (i.e., 0.09030980847) are kept as they do not exceed the value of 0.01, and all other determined measures of similarity are discarded. It is noted that the embodiments described herein are not limited to the predetermined threshold described above and that other predetermined thresholds may be utilized. The resulting measures of similarity may be weighted by the impact of the corresponding parameter, as described above with reference to FIGS. 3 and 4 to generate a list of potential mappings. For each parameter, GUI customizer 114 may assign the obtained brand color having the highest weighted measure of similarity (or potential mapping value) to the parameter.

It is noted that GUI customizer 114 may assign brand color(s) to a plurality of different parameters, including hundreds or even thousands of parameters in an automated fashion in accordance with the various embodiments described above.

After assigning brand color(s) to different parameters, GUI customizer 114 may cause the GUI of application 109 to be rendered (e.g., on display screen 118) based on the assigned brand color(s). It is noted that in an embodiment in which design system 110, graph representation generator 112, brand color obtainer 116, and/or GUI customizer 114 are incorporated into application 109, user interface 122 may be the GUI of application 109 and may comprise one or more user interface elements to invoke and/or utilize design system 110, graph representation generator 112, brand color obtainer 116, and/or GUI customizer 114 within application 109, to specify brand color(s), and/or to upload an image representative of the organization for analysis by design system 110.

Figure 7:
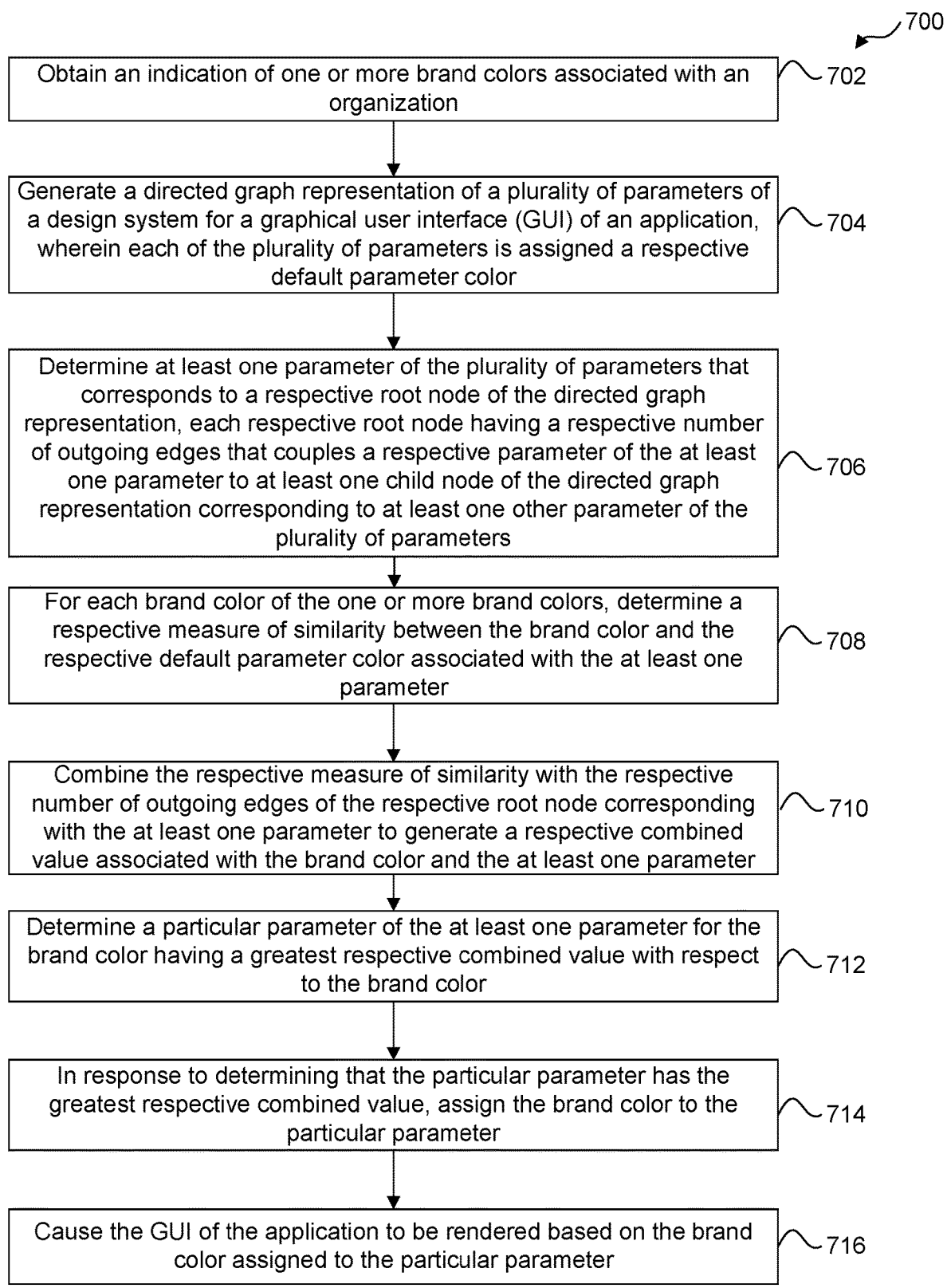
FIG. 7 is a flowchart illustrating a process for customizing a graphical user interface (GUI) based on one or more brand colors, according to some embodiments, according to some embodiments.

FIG. 7 is a flowchart for a method 700 for customizing a GUI based on brand color(s), according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIG. 1. However, method 700 is not limited to that example embodiment.

In 702, brand color obtainer 116 may obtain an indication of one or more brand colors associated with an organization. For example, as described herein, brand color obtainer 116 may obtain the indication of the brand color(s) by determining the brand color(s) based on a color histogram of a logo of the organization or determining the brand color(s) via a large language model instructed to extract the brand color(s) from an image comprising the logo of the organization.

In 704, graph representation generator 112 may generate directed graph representation 117 of a plurality of parameters of design system 110 for GUI (e.g., user interface 122) of application 109, wherein each of the plurality of parameters is assigned a respective default parameter color.

In 706, GUI customizer 114 may determine at least one parameter of the plurality of parameters that corresponds to a respective root node of directed graph representation 117, each respective root node having a respective number of outgoing edges that couples a respective parameter of the at least one parameter to at least one child node of directed graph representation 117 corresponding to at least one other parameter of the plurality of parameters. For example, as shown in FIG. 2, GUI customizer 114 may determine that the @myBrandColor, @myTextColor, and @myContrastTextColor parameters correspond to root nodes (i.e., root nodes 202, 212, and 214). In an example, as described herein, GUI customizer 114 may rank each parameter of the at least one parameter based on each respective number of outgoing edges of each respective root node corresponding with each parameter.

In 708, GUI customizer 114 may, for each brand color of the one or more brand colors, determine a respective measure of similarity between the brand color and the respective default parameter color associated with the at least one parameter. Additional details regarding determining the measure of similarity are described below with reference to FIGS. 8 and 9. In an example, as described herein, GUI customizer 114 may determine that the respective measure of similarity between the brand color and the respective default parameter color associated with the at least one parameter is beyond a predetermined threshold, and in response to determining that the respective measure of similarity between the brand color and the respective default parameter color associated with the at least one parameter is beyond the predetermined threshold, may bypass assignment of the brand color to at least one parameter.

In step 710, GUI customizer 114 may combine the respective measure of similarity with the respective number of outgoing edges of the respective root node corresponding with the at least one parameter to generate a respective combined value associated with the brand color and the at least one parameter.

In step 712, GUI customizer 114 may determine a particular parameter of the at least one parameter for the brand color having a greatest respective combined value with respect to the brand color.

In step 714, GUI customizer 114 may, in response to determining that the particular parameter has the greatest respective combined value, assign the brand color to the particular parameter. In one example, as described herein, GUI customizer 114 may, for each respective combined value being less than the greatest respective combined value, bypass a respective brand color of the one or more of brand colors and the particular parameter associated with the respective combined value for assignment. That is, a brand color associated with a respective combined value that is less than the greatest respective combined value may not be assigned to a corresponding parameter.

In step 716, GUI customizer 114 may cause the GUI (e.g., user interface 122) of application 109 to be rendered (e.g., via display screen 118) based on the brand color assigned to the particular parameter.

In an embodiment, the brand color is associated with a plurality of first color values, and the respective default parameter color associated with the at least one parameter is associated with a plurality of second color values.

In an embodiment, the plurality of first color values comprises a first hue value, a first saturation value, and a first lightness value, and wherein the plurality of second color values comprises a second hue value, a second saturation value, and a second lightness value.

Figure 8:
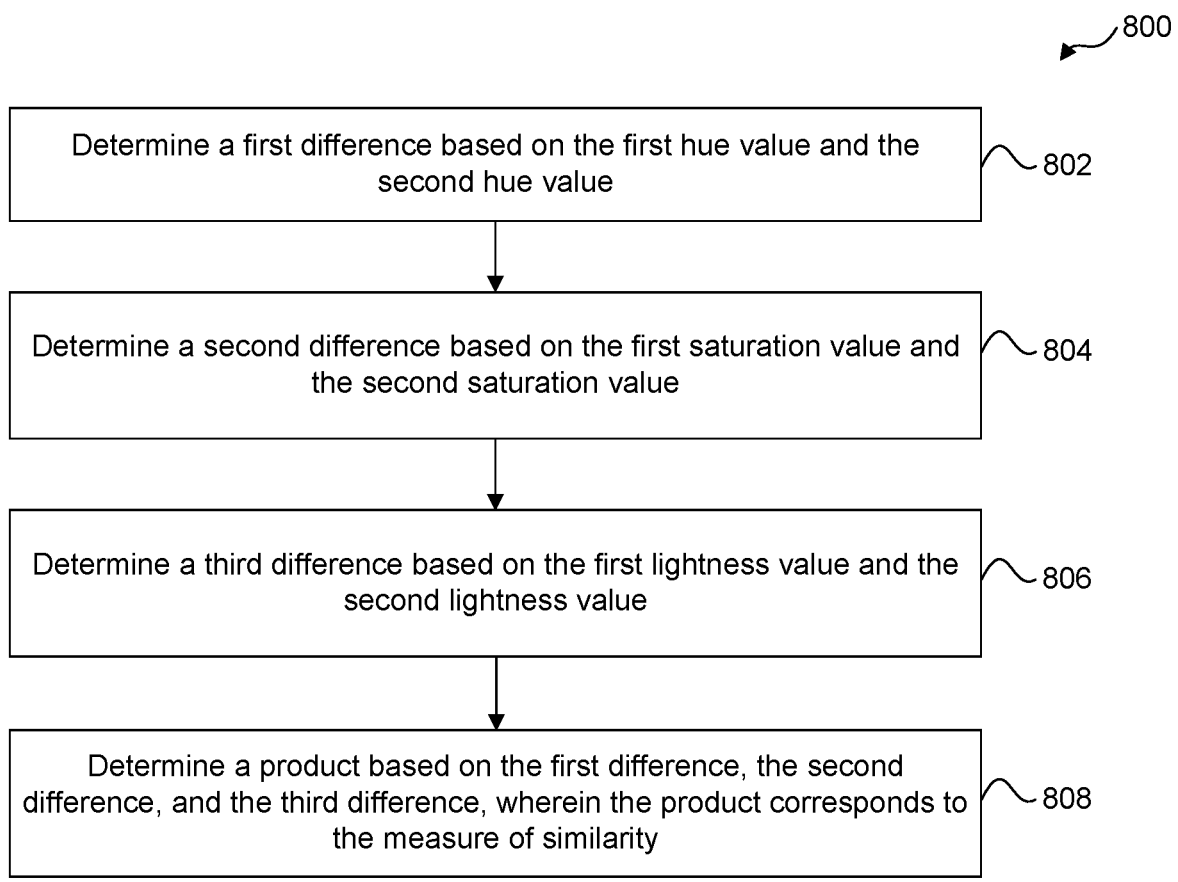
FIG. 8 is a flowchart for a method for determining a measure of similarity between a brand color and a default parameter color associated with a parameter based on a product of differences of different color values, according to some embodiments.

FIG. 8 is a flowchart for a method 800 for determining a measure of similarity between a brand color and a default parameter color associated with a parameter based on a product of differences of different color values, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 shall be described with reference to FIG. 1. However, method 800 is not limited to that example embodiment.

In 802, GUI customizer 114 may determine a first difference based on the first hue value and the second hue value. For example, referring FIG. 4, GUI customizer 114 may determine a difference between the hue value for the brand color light pink and the hue value for the default parameter color light green. In an embodiment, GUI customizer 114 may square the determined difference.

In 804, GUI customizer 114 may determine a second difference based on the first saturation value and the second saturation value. For example, referring FIG. 4, GUI customizer 114 may determine a difference between the saturation value for the brand color light pink and the saturation value for the default parameter color light green. In an embodiment, GUI customizer 114 may square the determined difference.

In 804, GUI customizer 114 may determine a third difference based on the first lightness value and the second lightness value. For example, referring FIG. 4, GUI customizer 114 may determine a difference between the lightness value for the brand color light pink and the lightness value for the default parameter color light green. In an embodiment, GUI customizer 114 may square the determined difference.

In 806, GUI customizer 114 may determine a product based on the first difference, the second difference, and the third difference, wherein the product corresponds to the measure of similarity.

Figure 9:
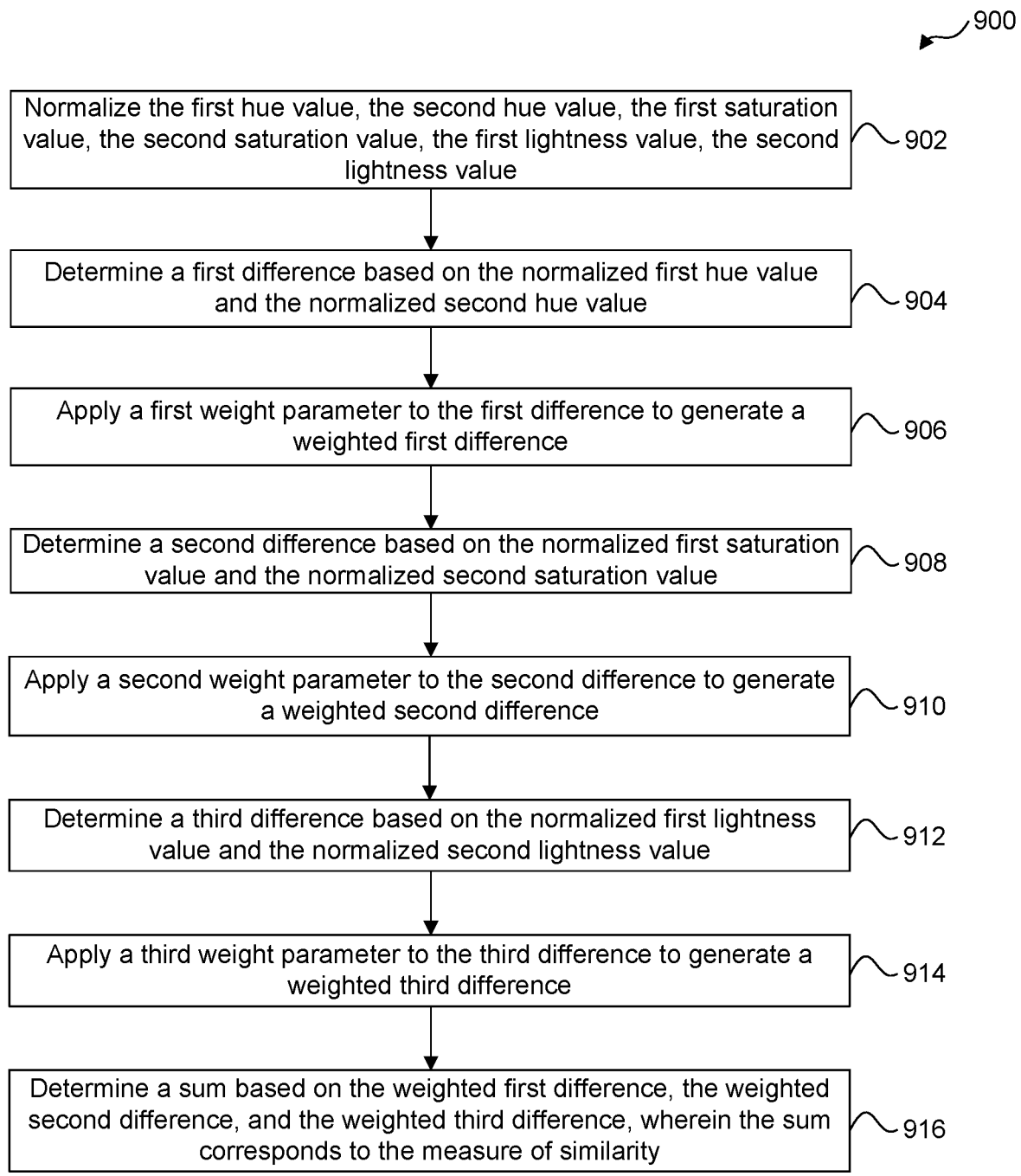
FIG. 9 is a flowchart for a method for determining a measure of similarity between a brand color and a default parameter color associated with a parameter based on a sum of differences of different color values, according to some embodiments.

FIG. 9 is a flowchart for a method 900 for determining a measure of similarity between a brand color and a default parameter color associated with a parameter based on a sum of differences of different color values, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art.

Method 900 shall be described with reference to FIG. 1. However, method 900 is not limited to that example embodiment.

In 902, GUI customizer 114 may normalize the first hue value, the second hue value, the first saturation value, the second saturation value, the first lightness value, the second lightness value.

In 904, GUI customizer 114 may determine a first difference based on the normalized first hue value and the normalized second hue value. For example, referring FIG. 6, GUI customizer 114 may determine a difference between the normalized hue value for the brand color light pink and the normalized hue value for the default parameter color light green. In an embodiment, GUI customizer 114 may square the determined difference.

In 906, GUI customizer 114 may apply a first weight parameter to the first difference to generate a weighted first difference.

In 908, GUI customizer 114 may determine a second difference based on the normalized first saturation value and the normalized second saturation value. For example, referring FIG. 6, GUI customizer 114 may determine a difference between the normalized saturation value for the brand color light pink and the normalized saturation value for the default parameter color light green. In an embodiment, GUI customizer 114 may square the determined difference.

In 910, GUI customizer 114 may apply a second weight parameter to the second difference to generate a weighted second difference.

In 912, GUI customizer 114 may determine a third difference based on the normalized first lightness value and the normalized second lightness value. For example, referring FIG. 6, GUI customizer 114 may determine a difference between the normalized lightness value for the brand color light pink and the normalized lightness value for the default parameter color light green. In an embodiment, GUI customizer 114 may square the determined difference.

In 914, GUI customizer 114 may apply a third weight parameter to the third difference to generate a weighted second difference.

In 916, GUI customizer 114 may determine a sum based on the weighted first difference, the weighted second difference, and the weighted third difference, wherein the sum corresponds to the measure of similarity.

Figure 10:
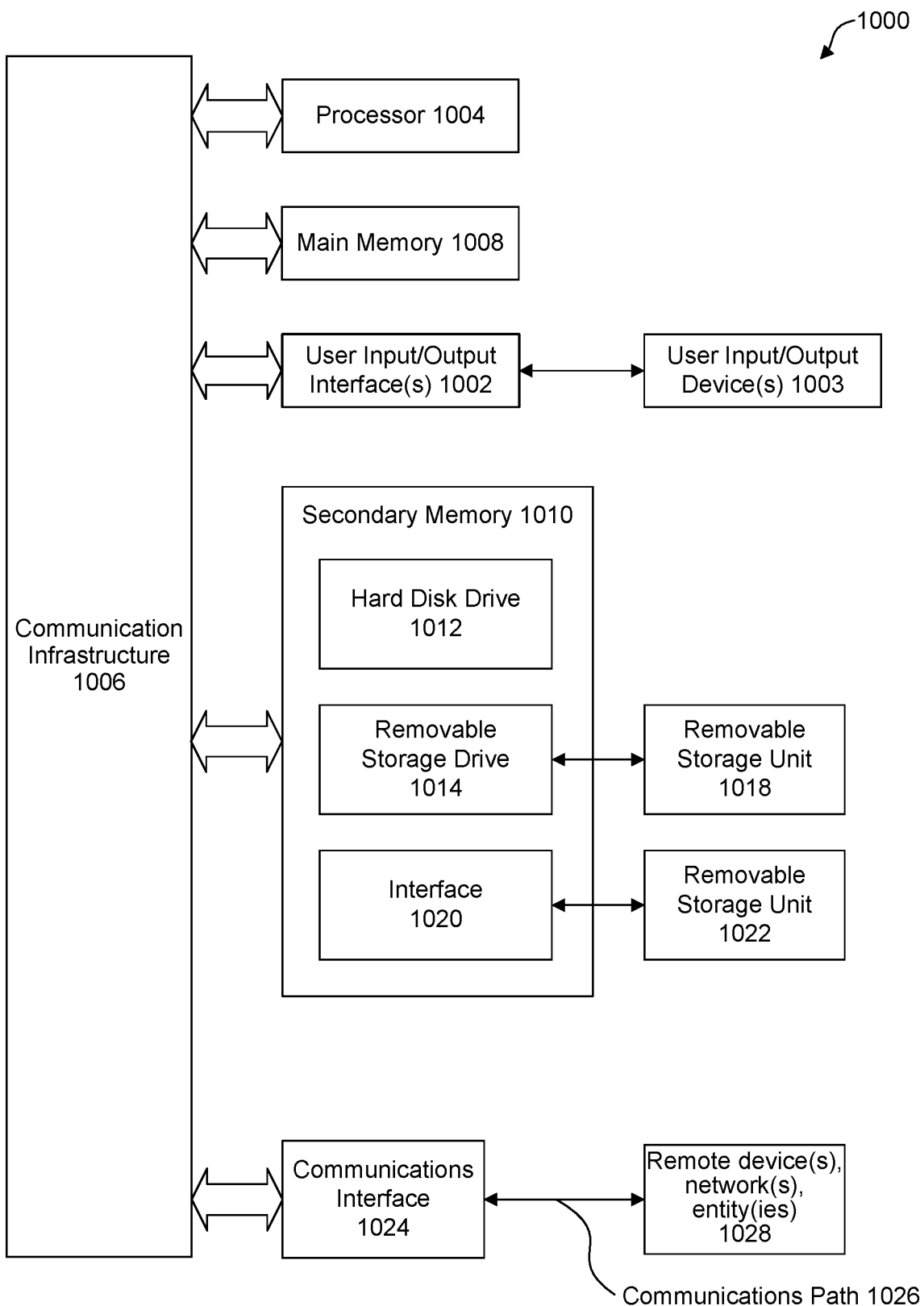
FIG. 10 is an example computer system useful for implementing various embodiments.

Various embodiments may be implemented, for example, using one or more well-known computer systems, such as computer system 1000 shown in FIG. 10. One or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
obtaining an indication of one or more brand colors associated with an organization;
generating a directed graph representation of a plurality of parameters of a design system for a graphical user interface (GUI) of an application, wherein each of the plurality of parameters is assigned a respective default parameter color;
determining at least one parameter of the plurality of parameters that corresponds to a respective root node of the directed graph representation, each respective root node having a respective number of outgoing edges that couples a respective parameter of the at least one parameter to at least one child node of the directed graph representation corresponding to at least one other parameter of the plurality of parameters; and for each brand color of the one or more brand colors:
  determining a respective measure of similarity between the brand color and the respective default parameter color associated with the at least one parameter;
  combining the respective measure of similarity with the respective number of outgoing edges of the respective root node corresponding with the at least one parameter to generate a respective combined value associated with the brand color and the at least one parameter;
  determining a particular parameter of the at least one parameter for the brand color having a greatest respective combined value with respect to the brand color;
  in response to determining that the particular parameter has the greatest respective combined value, assigning the brand color to the particular parameter; and
  causing the GUI of the application to be rendered based on the brand color assigned to the particular parameter.

2. The computer-implemented method of claim 1, wherein obtaining the one or more brand colors comprises one of:
  determining the one or more brand colors based on a color histogram of a logo of the organization; or
  determining the one or more brand colors via a large language model instructed to extract the one or more brand colors from an image comprising the logo of the organization.

3. The computer-implemented method of claim 1, further comprising:
  ranking each parameter of the at least one parameter based on each respective number of outgoing edges of each respective root node corresponding with each parameter.

4. The computer-implemented method of claim 1, further comprising:
  determining that the respective measure of similarity between the brand color and the respective default parameter color associated with the at least one parameter is beyond a predetermined threshold; and
  in response to determining that the respective measure of similarity between the brand color and the respective default parameter color associated with the at least one parameter is beyond the predetermined threshold, bypassing assignment of the brand color to at least one parameter.

5. The computer-implemented method of claim 1, further comprising:
  for each respective combined value being less than the greatest respective combined value, bypassing a respective brand color of the one or more of brand colors and the particular parameter associated with the respective combined value for assignment.

6. The computer-implemented method of claim 1, wherein the brand color is associated with a plurality of first color values, and wherein the respective default parameter color associated with the at least one parameter is associated with a plurality of second color values.

7. The computer-implemented method of claim 6, wherein the plurality of first color values comprises a first hue value, a first saturation value, and a first lightness value, and wherein the plurality of second color values comprises a second hue value, a second saturation value, and a second lightness value.

8. The computer-implemented method of claim 7, wherein determining the respective measure of similarity between the brand color and the respective default parameter color associated with the at least one parameter comprises:
  determining a first difference based on the first hue value and the second hue value;
  determining a second difference based on the first saturation value and the second saturation value;
  determining a third difference based on the first lightness value and the second lightness value; and
  determining a product based on the first difference, the second difference, and the third difference, wherein the product corresponds to the respective measure of similarity.

9. The computer-implemented method of claim 7, wherein determining the respective measure of similarity between the brand color and the respective default parameter color associated with the at least one parameter comprises:
  normalizing the first hue value, the second hue value, the first saturation value, the second saturation value, the first lightness value, the second lightness value;
  determining a first difference based on the normalized first hue value and the normalized second hue value;
  applying a first weight parameter to the first difference to generate a weighted first difference;
  determining a second difference based on the normalized first saturation value and the normalized second saturation value;
  applying a second weight parameter to the second difference to generate a weighted second difference;
  determining a third difference based on the normalized first lightness value and the normalized second lightness value;
  applying a third weight parameter to the third difference to generate a weighted third difference; and
  determining a sum based on the weighted first difference, the weighted second difference, and the weighted third difference, wherein the sum corresponds to the respective measure of similarity.

10. A system, comprising:
a memory; and
at least one processor coupled to the memory and configured to:
  obtain an indication of one or more brand colors associated with an organization;
  generate a directed graph representation of a plurality of parameters of a design system for a graphical user interface (GUI) of an application, wherein each of the plurality of parameters is assigned a respective default parameter color;
  determine at least one parameter of the plurality of parameters that corresponds to a respective root node of the directed graph representation, each respective root node having a respective number of outgoing edges that couples a respective parameter of the at least one parameter to at least one child node of the directed graph representation corresponding to at least one other parameter of the plurality of parameters; and
  for each brand color of the one or more brand colors:
    determine a respective measure of similarity between the brand color and the respective default parameter color associated with the at least one parameter;

combine the respective measure of similarity with the respective number of outgoing edges of the respective root node corresponding with the at least one parameter to generate a respective combined value associated with the brand color and the at least one parameter;

determine a particular parameter of the at least one parameter for the brand color having a greatest respective combined value with respect to the brand color;

in response to a determination that the particular parameter has the greatest respective combined value, assign the brand color to the particular parameter; and cause the GUI of the application to be rendered based on the brand color assigned to the particular parameter.

11. The system of claim 10, wherein, to obtain the one or more brand colors, the at least one processor is configured to:

determine the one or more brand colors based on a color histogram of a logo of the organization; or determine the one or more brand colors via a large language model instructed to extract the one or more brand colors from an image comprising the logo of the organization.

12. The system of claim 10, wherein the at least one processor is further configured to:

rank each parameter of the at least one parameter based on each respective number of outgoing edges of each respective root node corresponding with each parameter.

13. The system of claim 10, wherein the at least one processor is further configured to:

determine that the respective measure of similarity between the brand color and the respective default parameter color associated with the at least one parameter is beyond a predetermined threshold; and in response to a determination that the respective measure of similarity between the brand color and the respective default parameter color associated with the at least one parameter is beyond the predetermined threshold, bypass assignment of the brand color to at least one parameter.

14. The system of claim 10, wherein the at least one processor is further configured to:

for each respective combined value being less than the greatest respective combined value, bypass a respective brand color of the one or more of brand colors and the particular parameter associated with the respective combined value for assignment.

15. The system of claim 10, wherein the brand color is associated with a plurality of first color values, and wherein the respective default parameter color associated with the at least one parameter is associated with a plurality of second color values.

16. The system of claim 15, wherein the plurality of first color values comprises a first hue value, a first saturation value, and a first lightness value, and wherein the plurality of second color values comprises a second hue value, a second saturation value, and a second lightness value.

17. The system of claim 16, wherein, to determine the respective measure of similarity between the brand color and the respective default parameter color associated with the at least one parameter, the at least one processor is configured to:

determine a first difference based on the first hue value and the second hue value;

determine a second difference based on the first saturation value and the second saturation value;

determine a third difference based on the first lightness value and the second lightness value; and determine a product based on the first difference, the second difference, and the third difference, wherein the product corresponds to the respective measure of similarity.

18. The system of claim 16, wherein, to determine the respective measure of similarity between the brand color and the respective default parameter color associated with the at least one parameter, the at least one processor is configured to:

normalize the first hue value, the second hue value, the first saturation value, the second saturation value, the first lightness value, the second lightness value;

determine a first difference based on the normalized first hue value and the normalized second hue value;

apply a first weight parameter to the first difference to generate a weighted first difference;

determine a second difference based on the normalized first saturation value and the normalized second saturation value;

apply a second weight parameter to the second difference to generate a weighted second difference;

determine a third difference based on the normalized first lightness value and the normalized second lightness value;

apply a third weight parameter to the third difference to generate a weighted third difference; and determine a sum based on the weighted first difference, the weighted second difference, and the weighted third difference, wherein the sum corresponds to the respective measure of similarity.

19. A non-transitory computer-readable device having instructions stored thereon that, when executed by at least one computing device, causes the at least one computing device to perform operations, the operations comprising:

obtaining an indication of one or more brand colors associated with an organization;

generating a directed graph representation of a plurality of parameters of a design system for a graphical user interface (GUI) of an application, wherein each of the plurality of parameters is assigned a respective default parameter color;

determining at least one parameter of the plurality of parameters that corresponds to a respective root node of the directed graph representation, each respective root node having a respective number of outgoing edges that couples a respective parameter of the at least one parameter to at least one child node of the directed graph representation corresponding to at least one other parameter of the plurality of parameters; and for each brand color of the one or more brand colors:

determining a respective measure of similarity between the brand color and the respective default parameter color associated with the at least one parameter;

combining the respective measure of similarity with the respective number of outgoing edges of the respective root node corresponding with the at least one parameter to generate a respective combined value associated with the brand color and the at least one parameter;

determining a particular parameter of the at least one parameter for the brand color having a greatest respective combined value with respect to the brand color;

in response to determining that the particular parameter has the greatest respective combined value, assigning the brand color to the particular parameter; and causing the GUI of the application to be rendered based on the brand color assigned to the particular parameter.

20. The non-transitory computer-readable device of claim 19, wherein obtaining the one or more brand colors comprises one of:

determining the one or more brand colors based on a color histogram of a logo of the organization; or determining the one or more brand colors via a large language model instructed to extract the one or more brand colors from an image comprising the logo of the organization.

* * * * *